(12) United States Patent
Elliot

(10) Patent No.: X8431
(45) Date of Patent: Oct. 4, 1834

(54) POWER, ALTERNATE MOTION FOR

(76) Inventor: Benjamin Elliot

Benjamin Elliot of Danby, New York.
Letters Patent

The schedule referred to in these letters patent and making a
part of the same, containing a description in the words of the said
Benjamin Elliot himself of his improvement in a machine to produce
alternate motion applicable to churns, and to propell other machi-
nery To all to whom these presents shall come
Be it known that I Benjamin Elliot of the town of Danby in the
County of Tompkins, and State of New York, have invented a new and
useful improvement in a Machine to produce alternate motion
applicable to churns and to propell other machinery; and that the
following is a full and exact description of the construction and
operation of the said Machine as invented and improved by me
The machine consists first of four upright posts framed into side
and end rails of a sufficient height to elevate the machinery
hereinafter described above the churn or other machine to be propelled
across the centre of this frame and secured to the top rail is a
shaft which passes through the lower side of an oblong square
frame made of wood or metal and standing vertically over the
supporting frame between the side rails thereof which frame is in-
-tended to vibrate backwards on the said shaft, from the extremity
of the lower side of the vertical frame extends downwards and under
the supporting frame a stirrup of Iron or wood, which may be
curved or angular, to the centre of which is attached a weight
that causes when in motion the frame to vibrate steadily precisely
on the principle of a pendulum, In the centre of the vertical frame,
is placed a vertical shaft its lower end running in a box fixed in the
upper side of the lower rail of the vertical frame and the upper
secured in the top rail of said frame with a thumb screw, to - regulate and confine it at the upper end of the vertical shaft is to be attached a lever weighted at its outer extremity by a weight proportioned to the length of the lever, and power required The weight may also be made moveable along the lever, and secured at such a distance from the shaft as will produce the power desired in the foot of the shaft is placed a pinion wheel of peculiar form viz, the levers are to be bevelled from the centre to opposite directions the object of which is to permit the vertical frame to vibrate when said pinion is in gear, A horizontal cog wheel which mashes in the double bevelled pinion aforesaid, has its bearing in one of the top rails of the supporting frame, and a frame raised above said rail its lower side has a bevelled gearing which works into a bevel wheel fixed on the main shaft which has its bearing on the supporting frame produced in any way most convenient is fitted to a barrel on which a cord winds that draws up the weight by which the machine is operated It is also supplied with a ratchet & spring or hand similar to those used in Clockwork so as to admit of being wound up when run down, the alternate motion when applied to Churns is taken from the lower side of the vertical frame by means of two levers of proper length attached thereto on opposite sides of the vertical shaft, and having their centres of motion on the side rail of the supporting frame. their outer extremities being attached to the dasher rods of the Churn or cranks of the ma-chine to be operated, — Operation the weight being wound up motion by means of the gearing is communicated to the vertical shaft which being set in revolution the weighted lever causes the vertical frame and its weight to vibrate and the levers attached to the lower rail of said frame to move the churn dasher rods up and down or revolve the crank of the machinery designed to be operated — What I claim as new and as my invention, is the Vertical vibrating frame and its appended weight in combination with the weighted lever, the shaft and double —

United States Patent

Patent No.: X8431 bevelled pinion operated by a cog wheel as above described

In testimony that the foregoing is a true specification of my said improvement, I have hereunto set my hand at Washington this 27th day of September 1834

Benjamin Elliot

Witnesses

John D. Batt

Robt. Clark.

737 w82

Ex Pat.